UNITED STATES PATENT OFFICE.

RENÉ BOHN, OF LUDWIGSHAFEN-ON-THE-RHINE, BAVARIA, ASSIGNOR TO THE BADISCHE ANILIN AND SODA FABRIK, OF MANNHEIM, GERMANY.

ALIZARINE-BLUE GREEN.

SPECIFICATION forming part of Letters Patent No. 401,633, dated April 16, 1889.

Application filed October 18, 1888. Serial No. 288,430. (Specimens.)

*To all whom it may concern:*

Be it known that I, RENÉ BOHN, a citizen of Switzerland, residing at Ludwigshafen-on-the-Rhine, in the Kingdom of Bavaria and Empire of Germany, have invented new and useful Improvements in the Manufacture of Alizarine-Blue Green, of which the following is a specification.

My invention relates to the manufacture of an improved dye-stuff or coloring-matter produced by the successive action of sulphuric anhydride and of alkalies or mineral acids upon alizarine-blue.

In carrying out my invention I take about ten parts, by weight, of perfectly-dry and finely-powdered alizarine-blue and add the same in very small portions at a time to about one hundred parts, by weight, of fuming sulphuric acid containing about seventy per cent. of free anhydride. Throughout this operation the mixture is to be kept agitated and every rise of temperature ought to be carefully prevented by the application of external cooling. After the entire amount of alizarine-blue has thus been added—an operation which generally requires about eight hours time—the mixture or solution is to be agitated during the space of another five or six hours at a temperature of about 50° centigrade in order to complete the conversion of alizarine-blue into its new and extremely unstable derivative thus resulting from the energetic action of sulphuric anhydride employed in the above-recommended large excess. I then proceed to convert the said unstable derivative into my new coloring-matter or dye-stuff, which I term "alizarine-blue green" in order to indicate by this name both its origin and the difference of shade discernible between the respective results produced by the same and by alizarine-blue in dyeing and printing. For the said purpose I may first separate the above-named unstable derivative from its acid solvent by carefully pouring the result of the preceding operation upon lumps of ice and treating the precipitate thus obtained either with alkalies or with hydrochloric or sulphuric acids at an ordinary or slightly-elevated temperature until a sample of the product dissolves in caustic soda liquor with a bright-green color. In order to produce commercially alizarine-blue green, however, no such separation and after-treatment of the unstable derivative (resulting from the action of sulphuric anhydride upon alizarine-blue) is required and made use of; but by preference about two hundred parts, by weight, of concentrated or rectified sulphuric acid of about 1.84 specific gravity are directly added to the result of the above-described operation, and the mixture or solution is then heated to about from 50° to 60° centigrade; or it may be allowed to stand at an ordinary temperature until it assumes a bright-red color and until a sample of the same when poured into water yields a precipitate which dissolves in carbonate-of-soda liquor with a blue color and forms the before-mentioned bright-green solution with caustic soda or potash. This point being reached, the result of the operation is poured into water, and the brown-red precipitate thus produced is then filtered and well washed with water. A complete purification of the coloring-matter may afterward be effected by dissolving the same in bisulphite of potash, soda, or ammonia and decomposing the solution of the bisulphite compound thus obtained by means of hydrochloric or sulphuric acid, when alizarine-blue green will separate out in fine needle-shaped crystals.

Alizarine-blue green prepared as above described presents the following characteristic properties: It is soluble in much boiling water. The solution possesses a blackish-purple color, which upon the addition of a very large quantity of water turns into a blue green. Concentrated or rectified sulphuric acid dissolves the coloring-matter with a bright red or crimson color, while fuming sulphuric acid of about twenty-three per cent. of free anhydride forms a blue-green solution. The above-mentioned green solutions in caustic alkalies are not precipitated by adding thereto a large excess of the latter solvents.

Alizarine-blue green may be employed in dyeing and printing in a similar manner and in conjunction with the same or similar mordants, as alizarine-blue. Its before-named bisulphite compounds—say the bisulphite-of-sodium compound, which may be obtained in a well-crystallized condition in an analogous manner as the corresponding well-known bisulphite derivative of alizarine-blue—that is to say, by the addition of chloride of sodium to the solution of the coloring-matter in bisulphite-of-soda liquor—are particularly useful for printing cotton fabrics. The shades thus produced are of a considerably greener hue than the corresponding shades of alizarine-blue.

The colors produced with the aid of chrome, nickel, or zinc mordants are partly distinguished by their bright blue-green tint.

I make no claim in this application to the coloring-matter described in an application filed by me the 18th day of October, 1888, Serial No. 288,429.

What I claim as new, and desire to secure by Letters Patent, is—

As a new product, the coloring-matter or dye-stuff (alizarine-blue green) hereinbefore described, and having the following characteristics: With much boiling water it forms a blackish-purple solution, which, by the addition of a very large quantity of water, assumes a blue-green color; in concentrated or rectified sulphuric acid it dissolves with a bright red or crimson color; in fuming sulphuric acid containing about twenty-three per cent. of free anhydride it forms a blue-green solution; with caustic alkalies it forms bright-green solutions which are not precipitated by adding thereto a large excess of these solvents; its bisulphite-of-sodium compound is particularly useful for printing cotton fabrics, the shades produced being of a considerably greener hue than the corresponding shades of alizarine-blue; the colors produced with the aid of chrome, nickel, or zinc mordants are partly distinguished by their bright blue-green tint.

In testimony whereof I have hereunto set my hand in the presence of two subscribing witnesses.

RENÉ BOHN.

Witnesses:
AUGUST HAUSER,
JOHANNES BÜTTNER.